(No Model.)
L. F. PARKS.
BICYCLE.
No. 591,566. Patented Oct. 12, 1897.
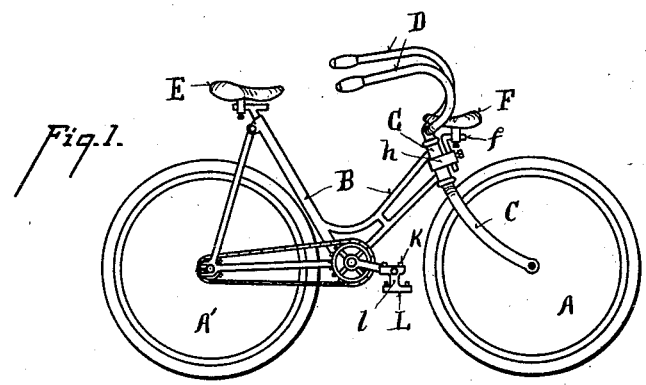
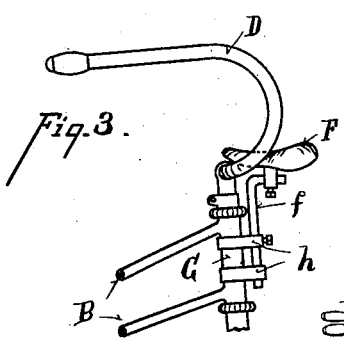
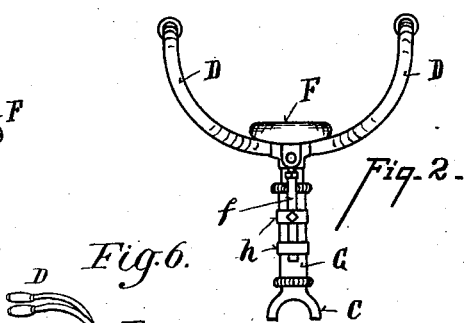
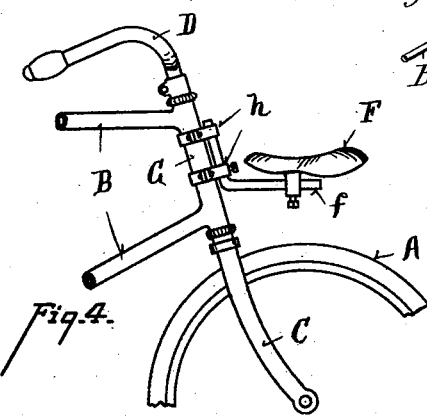
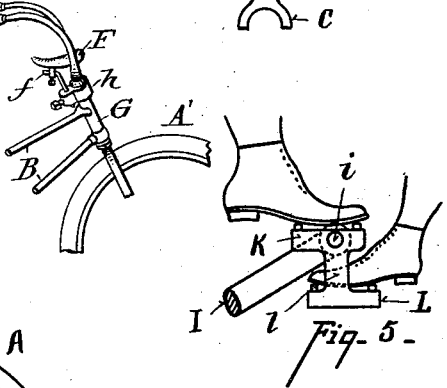
Witnesses
Oliver B. Kaiser.
Edw'd J. Alexander
Inventor
Lewis F. Parks
By C. W. Miles
Attorney

UNITED STATES PATENT OFFICE.

LEWIS F. PARKS, OF CINCINNATI, OHIO.

BICYCLE.

SPECIFICATION forming part of Letters Patent No. 591,566, dated October 12, 1897.

Application filed July 24, 1896. Serial No. 600,450. (No model.)

*To all whom it may concern:*

Be it known that I, LEWIS F. PARKS, residing at Cincinnati, in the county of Hamilton and State of Ohio, have invented certain new and useful Improvements in Bicycles, of which the following is a specification.

My invention relates to improvements in bicycles. Its object is to provide a bicycle adapted to be used without inconvenience in the usual manner by a single person and which may also be ridden and propelled simultaneously by two persons, all of which will be more fully explained in the description of the accompanying drawings, making a part of this specification, in which—

Figure 1 is a side elevation of my improved bicycle adapted to be used by either ladies or gentlemen. Fig. 2 is an enlarged front end view of the upper portion of the frame. Fig. 3 is a side elevation of Fig. 2. Fig. 4 is a view similar to Fig. 3 of a modification adapted for use by men and boys. Fig. 5 is a detailed view of the pedals. Fig. 6 shows a modification of the manner of supporting the forward saddle.

A A' represent the front and rear wheels, respectively; B, the main frame; C, the front fork, and D the handle-bars.

E represents the saddle employed when one person rides the bicycle.

F represents the saddle for the second person, which is mounted upon a saddle-post *f*, secured in one or more brackets *h*, clamped or otherwise secured to the head G of the main frame.

When adapted for use by ladies, the head of the main frame is set low and the handle-bars branch below the saddle F and curve outwardly, upwardly, and then backwardly, so as to be grasped by the persons on both saddles. The person on the saddle F sits between the handle-bars, facing rearwardly and with his or her feet on one section of the duplex pedal, while the person on the rear saddle sits in the usual manner with feet on the other section of the pedal.

I have shown the saddle F in Figs. 1, 2, and 3 mounted on the front of the head G. It may, however, be mounted on the opposite side of the head, as shown in Fig. 6, or directly above the fork of the handle-bars, if desired. I prefer to mount it as far forward as possible, so as to give sufficient space between the riders.

The preferred form of pedal is that shown in Figs. 1 and 5, in which *i* represents the pedal-pin, I the crank-arm, and K the pedal usually employed.

L represents a second pedal-section, the duplicate of section K, and hung therefrom by means of arms *l*. Other forms of pedal may be used, however.

In the modification shown in Fig. 4, which is adapted for use by men and boys, the wheel may be of the usual form of construction, with the exception of the additional saddle F and pedals adapted to receive the feet of both riders.

Having described my invention, what I claim is—

1. A bicycle having a saddle located over the rear wheel, and facing forward, a saddle located over the forward wheel and facing rearward, a common crank-shaft located between said saddles and provided with pedals adapted to receive the feet of both riders, substantially as specified.

2. In a bicycle a main frame provided with a saddle over the rear wheel facing forward, a saddle over the front wheel facing rearwardly, a common crank-shaft located between said saddles and provided with pedals adapted to receive the feet of both riders, and handle-bars curving from beneath said forward saddle outwardly and upwardly, substantially as specified.

3. A bicycle having a saddle over the rear wheel facing forward, a saddle over the forward wheel facing rearward, said forward saddle being located between the handle-bars, which are curved from beneath the saddle outwardly, upwardly, and rearwardly so as to leave room between the handle-bars for the person on the forward saddle, and so as to be grasped by both riders, and a common crank-shaft located between said saddles and provided with pedals adapted to receive the feet of both riders.

In testimony whereof I have hereunto set my hand.

LEWIS F. PARKS.

Witnesses:
C. W. MILES,
OLIVER B. KAISER.